July 25, 1933.    C. A. BLUHM    1,920,055
SHOCK ABSORBER
Filed July 27, 1932
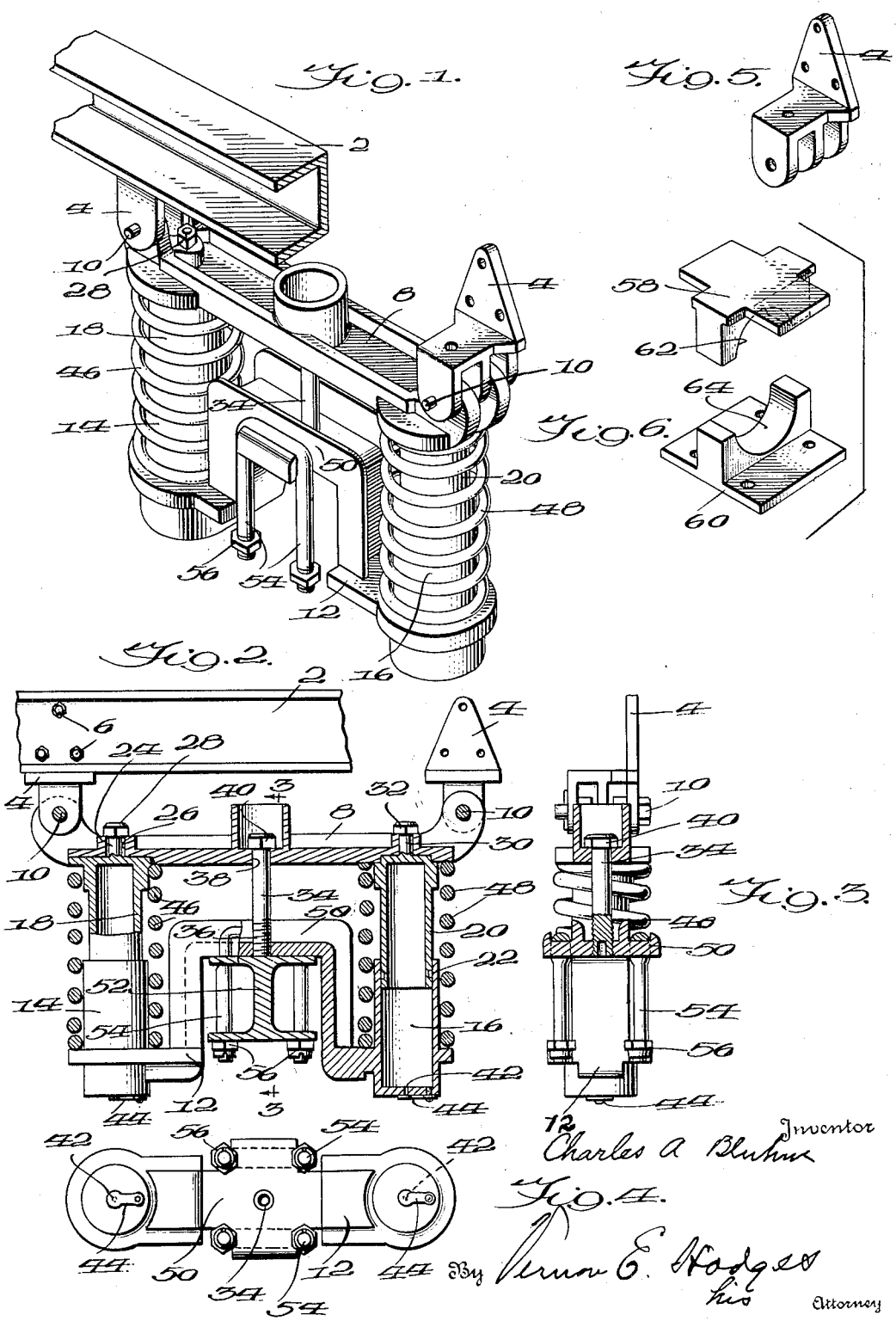
Inventor
Charles A. Bluhm
By Vernon E. Hodges
his Attorney Patented July 25, 1933

1,920,055

UNITED STATES PATENT OFFICE

CHARLES A. BLUHM, OF MICHIGAN CITY, INDIANA

SHOCK ABSORBER

Application filed July 27, 1932. Serial No. 625,087.

My invention relates to an improvement in shock absorbers.

The purpose of my invention is to provide a simple mechanical shock absorber for controlling the movement between the frame and an axle of an automobile.

An object of my invention is to provide a simple shock absorber which will control both the downward and upward motion of an axle of an automobile, thereby inhibiting the springs thereof from flexing too great a distance or too readily in either direction.

A further object of my invention is to provide a shock absorber which may be readily attached to either a front axle or a rear axle of an automobile.

In the accompanying drawing,

Fig. 1 is a perspective view of the shock absorber;

Fig. 2 is a side elevation partly in section;

Fig. 3 is a vertical section on the line 3—3, of Fig. 2;

Fig. 4 is a bottom plan view;

Fig. 5 is a perspective view of a bracket for attaching a shock absorber to a frame of the automobile; and Fig. 6 is a disassembled perspective view of an adaptor for securing the shock absorber to the rear axle or a round axle of an automobile.

The channel iron 2, of the automobile frame is secured to brackets 4, by means of bolts or rivets 6. The lower ends of the brackets 4 are pivoted to a yoke 8 of the shock absorber by means of pins or bolts 10.

The saddle 12 is provided at both ends thereof with upwardly extending cylinders 14 and 16, in which are mounted the pistons 18 and 20, which pistons are provided with the piston rings 22, for making close contact between the pistons and the cylinder walls.

I provide helical springs, 46 and 48, for tending to hold the cylinders 14 and 16, and the pistons 18 and 20, in their extended positions, as shown in Figs. 1 and 2.

The piston 18 is secured to the yoke 8, by the bolt 24, which is integrally attached to the piston 18, and which extends through the elongated slot 26, in the yoke 8, and is rigidly secured to the yoke 8, by the nut 28. The piston 20 is similarly secured to the yoke 8, by means of the bolt 30 and nut 32.

In the center of the saddle 12, I provide an elongated bolt 34, which is secured to the saddle 12 by means of the screw-threads 36, the upper end of said bolt 34 being free to slide through the hole 38 in the yoke 8, as the saddle moves upwardly approaching the frame 2, of the automobile. The head 40 of the bolt 34, limits the downward motion thereof, by abutting against the yoke 8.

I provide small apertures 42, at the bottom of the cylinders 14 and 16 for the egress of air, which egress is inhibited by the valves 44, from the interior of the cylinders, as the saddle 12 approaches the frame 2. The valves 44 close the apertures 42 from the outside thereof, and further inhibit the ingress of air, as the saddle 12 attempts to assume its normal position relative to the frame 2, thereby making the downward motion of the saddle 12 relatively slow and absorbing any shock which might otherwise result.

The saddle 12 is provided with an inverted U-shaped portion 50, which is adapted to be placed over the axle 52, and secured thereto by the U-bolts 54, and nuts 56.

When it is desired to attach my shock absorber to a rear axle or round axle, I utilize the adaptors 58 and 60, which are provided with substantially semi-circular surfaces 62 and 64, for engaging a round axle. The adaptors 58 and 60 are provided also with flat surfaces which will assume position of an ordinary I-beam axle and can thereby be bolted to the inverted U-shaped portion 50, by the strap bolts 54, and the nuts 56, as shown in Fig. 2.

Heretofore shock absorbers of this general type have been made, but the common fault with those shock absorbers has been that there were too many moving parts which required regular lubrication. It has been found that it is difficult to keep such shock absorbers properly lubricated by reason of that fact that shock absorbers are mounted in such a position on the automobile that they receive a considerable amount of water and dirt from the road. I find that my present shock absorber does not require an objectionable amount of lubrication, the only moving parts which require lubrication being the cylinders 14 and 16, and the pistons 18 and 20.

It will be understood that I may make slight changes from time to time in the exact construction of my shock absorber, without departing from the scope of my invention and the appended claims.

I claim:

1. A shock absorber comprising a saddle having an intermediate portion of inverted U-shape for embracing an axle to be secured thereto, and having the lower ends thereof terminating in spring seating portions on opposite sides of said intermediate portion, telescoping shock absorbing cylinders connected with each of said spring seating portions, and helical springs engaging the seating portions and surrounding the telescoping members and normally tending to move said members relative to each other.

2. A shock absorber comprising a saddle having an intermediate portion of inverted U-shape for embracing an axle to be secured thereto, said inverted U-shaped portion having the lower ends thereof turned laterally in opposite directions forming spring supporting arms, a yoke opposing said saddle, telescoping shock absorbing members bearing against the spring supporting arms and the opposite ends of the yoke, helical springs surrounding said telescoping members and having the opposite ends thereof bearing against the ends of the yoke and the spring supporting arms.

3. A shock absorber comprising a saddle having an intermediate portion of inverted U-shape for embracing an axle to be secured thereto, said inverted U-shaped portion having the lower ends thereof turned laterally in opposite directions forming spring supporting arms, a yoke opposing said saddle, telescoping shock absorbing members bearing against the spring supporting arms and the opposite ends of the yoke, helical springs surrounding said telescoping members and having the opposite ends thereof bearing against the ends of the yoke and the spring supporting arms, and a bolt extending between the base of the inverted U-shaped portion and an intermediate portion of the yoke and having means for limiting relative separation therebetween.

4. A shock absorber comprising a saddle having an intermediate portion of inverted U-shape for embracing an axle to be secured thereto, said inverted U-shaped portion having the lower ends thereof turned laterally in opposite directions forming spring supporting arms, a yoke opposing said saddle, telescoping shock absorbing members bearing against the spring supporting arms and the opposite ends of the yoke, helical springs surrounding said telescoping members and having the opposite ends thereof bearing against the ends of the yoke and the spring supporting arms, a bolt extending between the base of the inverted U-shaped portion and an intermediate portion of the yoke and having means for limiting relative separation therebetween, and brackets pivoted to opposite end portions of the yoke for connecting said yoke to a vehicle frame.

5. A shock absorber comprising a saddle having an intermediate portion of inverted U-shape for embracing an axle to be secured thereto, said inverted U-shaped portion having the lower ends thereof turned laterally in opposite directions forming springs supporting arms, a yoke opposing said saddle, telescoping shock absorbing members bearing against the spring supporting arms and the opposite ends of the yoke, helical springs surrounding said telescoping members and having the opposite ends thereof bearing against the ends of the yoke and the spring supporting arms, and brackets pivoted to opposite end portions of the yoke for connecting said yoke to a vehicle frame.

6. A shock absorber comprising a saddle having an intermediate portion of inverted U-shape for embracing an axle to be secured thereto, said inverted U-shaped portion having the lower ends thereof turned laterally in opposite directions forming spring supporting arms, a yoke opposing said saddle, helical springs interposed between the spring supporting arms and the yoke and bearing thereagainst, and brackets pivoted to opposite end portions of the yoke for connecting said yoke to a vehicle frame.

7. A shock absorber comprising a saddle, a yoke, shock absorbing means interposed therebetween, said yoke having upstanding ears connected with opposite end portions thereof, brackets adapted to be connected to a vehicle frame, and means pivotally connecting said brackets and ears together.

8. A shock absorber comprising a saddle shaving an inverted U-shaped intermediate portion to embrace an axle, said portion having lugs extending laterally from opposite sides thereof, U-bolts arranged in inverted position over the lugs to secure the axle to said portion, and shock absorbing means connected with opposite end portions of the saddle.

CHARLES A. BLUHM.